(12) United States Patent
Nagashima

(10) Patent No.: US 7,264,302 B2
(45) Date of Patent: Sep. 4, 2007

(54) LOWER BODY CONSTRUCTION

(75) Inventor: Chikashi Nagashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/335,342

(22) Filed: Jan. 19, 2006

(65) Prior Publication Data

US 2006/0158008 A1    Jul. 20, 2006

(30) Foreign Application Priority Data

Jan. 20, 2005    (JP) .............................. 2005-012704

(51) Int. Cl.
    *B60J 7/00* (2006.01)
(52) U.S. Cl. .............................. 296/187.12; 296/203.04
(58) Field of Classification Search ........... 296/187.12, 296/209, 203.03
    See application file for complete search history.

(56) References Cited

U.S. PATENT DOCUMENTS

| 5,018,780 | A | * | 5/1991 | Yoshii et al. | ......... | 296/203.04 |
| 5,246,264 | A | * | 9/1993 | Yoshii | ........... | 296/187.12 |
| 5,354,115 | A | * | 10/1994 | Esaki | ............ | 296/187.12 |
| 5,613,727 | A | * | 3/1997 | Yamazaki | ......... | 296/187.12 |
| 6,073,992 | A | * | 6/2000 | Yamauchi et al. | ..... | 296/187.12 |
| 6,354,656 | B1 | * | 3/2002 | Hwang | ............. | 296/187.12 |
| 6,409,257 | B1 | * | 6/2002 | Takashina et al. | ..... | 296/187.12 |
| 6,854,795 | B2 | * | 2/2005 | Yamazaki et al. | ..... | 296/187.12 |

FOREIGN PATENT DOCUMENTS

| JP |    62018373 A | * | 1/1987 |
| JP |    11235984 A | * | 8/1999 |
| JP |  2001294178 A | * | 10/2001 |
| JP |     3315915   |   | 6/2002 |

* cited by examiner

*Primary Examiner*—Kiran B. Patel
(74) *Attorney, Agent, or Firm*—Rankin, Hill, Porter & Clark LLP

(57) ABSTRACT

With an excessive impact load generated by a side impact or collision, even in the event that a falling deformation of a pillar connected to a side sill occurs at an initial stage of the side impact, triggering a twisting deformation of the side sill as the side sill is pulled along with the falling deformation of the pillar, the side sill is allowed to maintain a high rigidity against the impact load at a middle stage of the side impact due to a projecting surface of a secondary reinforcement panel being made to be oriented upwards by virtue of the twisting deformation of the side sill.

4 Claims, 3 Drawing Sheets

LOWER BODY CONSTRUCTION

The present application claims foreign priority under 35 USC 119 based on Japanese Patent Application No. 2005-012704, filed Jan. 20, 2005, the content of which is incorporated herein by reference.

BACKGROUND OF THE INVENTION

1. Field of the Invention

The present invention relates to a lower body construction of a vehicle.

2. Description of Related Art

Side sills, which make up part of a monocoque body structure of a vehicle, are provided on both sides of a lower part of a body of the vehicle in such a manner as to extend in a longitudinal direction of the body, and a pillar forming a side framework of a passenger compartment is connected to each side sill. In addition, a reinforcement member is joined to the side sill in the interior thereof in order to suppress the deformation of the side sill towards the interior of the passenger compartment which is caused by an impact load generated when the vehicle is involved in a side collision (refer, for example, to Japanese Patent Publication No. 3315915 (claim 1, FIG. 1)(hereinafter referred as Patent Document No. 1)).

In the lower reinforcement construction of the body of the vehicle described in Patent Document No. 1, since three reinforcement panels (primary, secondary and tertiary reinforcement panels) are provided within a side sill of a box-shaped cross section which is made up of an outer panel and an inner panel and, in particular, the primary reinforcement panel positioned at a middle portion is formed into a shape having a substantially C-shaped cross section, the rigidity of the side sill can be increased.

Even when a reinforcement construction such as one described in Patent Document No. 1 is provided, however, in case a crash energy at the time of a side impact is excessive, a falling deformation (a bending deformation) of the pillar connected to the upper portion of the side sill towards the interior of the passenger compartment is generated, and at an initial stage of the side impact, a twisting deformation of the side sill in which a side of the side sill is made to face obliquely upwards is generated as the side sill is pulled along with the falling deformation of the pillar.

Due to this, at a middle stage of the side impact, since a projecting portion of the primary reinforcement panel which lies on a front side thereof to bear impact is made to face obliquely upwards together with the side sill, the rigidity of the side sill against the impact load is reduced.

SUMMARY OF THE INVENTION

Then, the invention was made with a view to coping with this, and an object thereof is to provide a lower body construction in which with an excessive impact load generated by a side impact or collision, even in the event that a falling deformation of a pillar connected to a side sill towards the interior of the passenger compartment occurs at an initial stage of the side impact, triggering a twisting deformation of the side sill as the side sill is pulled along with the falling deformation of the pillar to thereby cause a side of the side sill to be oriented upwards, the side sill is allowed to maintain a high rigidity against the impact load at a middle stage of the side impact.

With a view to attaining the object, according to a first aspect of the invention, there is provided a lower body construction comprising a tubular side sill extending in a longitudinal direction of a body of a vehicle and a pillar extending in a vertical direction of the body and connected to an upper portion of the side sill at a lower end portion thereof, the lower body construction having a primary reinforcement member interposed within the side sill in such a manner as to extend in the longitudinal direction of the body and having a projecting surface which projects towards the outside of a passenger compartment on a side of the body so that an opening thereof is oriented towards an inside of the passenger compartment, and a secondary reinforcement member joined to the primary reinforcement member along an upper edge portion and a lower edge portion thereof in such a manner as to straddle a lower corner portion or a lower curved portion of the projecting surface of the primary reinforcement member while extending in the longitudinal direction of the body and having a projecting surface which projects obliquely downwards at a middle portion between the upper edge portion and the lower edge portion, wherein the secondary reinforcement member is disposed at at least a portion on the primary reinforcement member which lies below a location where the side sill and the pillar are joined together.

According to the first aspect of the invention, even in the event that with an excessive impact load generated at the time of a side impact or collision, there occurs a falling deformation of the pillar connected to the side sill towards the interior of the passenger compartment, which then triggers a twisting deformation of the side sill as the side sill is pulled along with the falling deformation of the pillar at an initial stage of the side impact, the projecting surface of the secondary reinforcement member is made to be oriented towards the side of the body due to the twisting deformation of the side sill at a middle stage of the side impact, whereby a high rigidity of the side sill can be maintained against the impact load applied due to the side impact.

Additionally, according to a second aspect of the invention, there is provided a lower body construction as set forth in the first aspect of the invention, wherein cross members which extend in a transverse direction of the vehicle are joined to positions on a passenger compartment side of the side sill which correspond to vicinities of both longitudinal end portions of the secondary reinforcement member.

According to the second aspect of the invention, the impact load inputted into the secondary reinforcement member at the middle state of the side impact can effectively be absorbed by the cross members.

According to the first aspect of the invention, even in the event that with an excessive impact load generated at the time of a side impact or collision, there occurs a falling deformation of the pillar connected to the side sill towards the interior of the passenger compartment, which then triggers a twisting deformation of the side sill as the side sill is pulled along with the falling deformation of the pillar at the initial stage of the side impact, the projecting surface of the secondary reinforcement member is made to be oriented towards the side of the body due to the twisting deformation of the side sill at the middle stage of the side impact, whereby a high rigidity of the side sill can be maintained against the impact load applied due to the side impact, and therefore, it is possible to suppress not only the deformation of the side sill towards the interior of the passenger compartment but also the falling deformation of the pillar connected to the upper portion of the side sill towards the interior of the passenger compartment.

According to the second aspect of the invention, the impact load inputted into the secondary reinforcement member at the middle state of the side impact can effectively be absorbed by the cross members, and therefore, it is possible to effectively suppress the deformation of the side sill towards the interior of the passenger compartment.

DETAILED DESCRIPTION OF THE INVENTION

Figure 1:
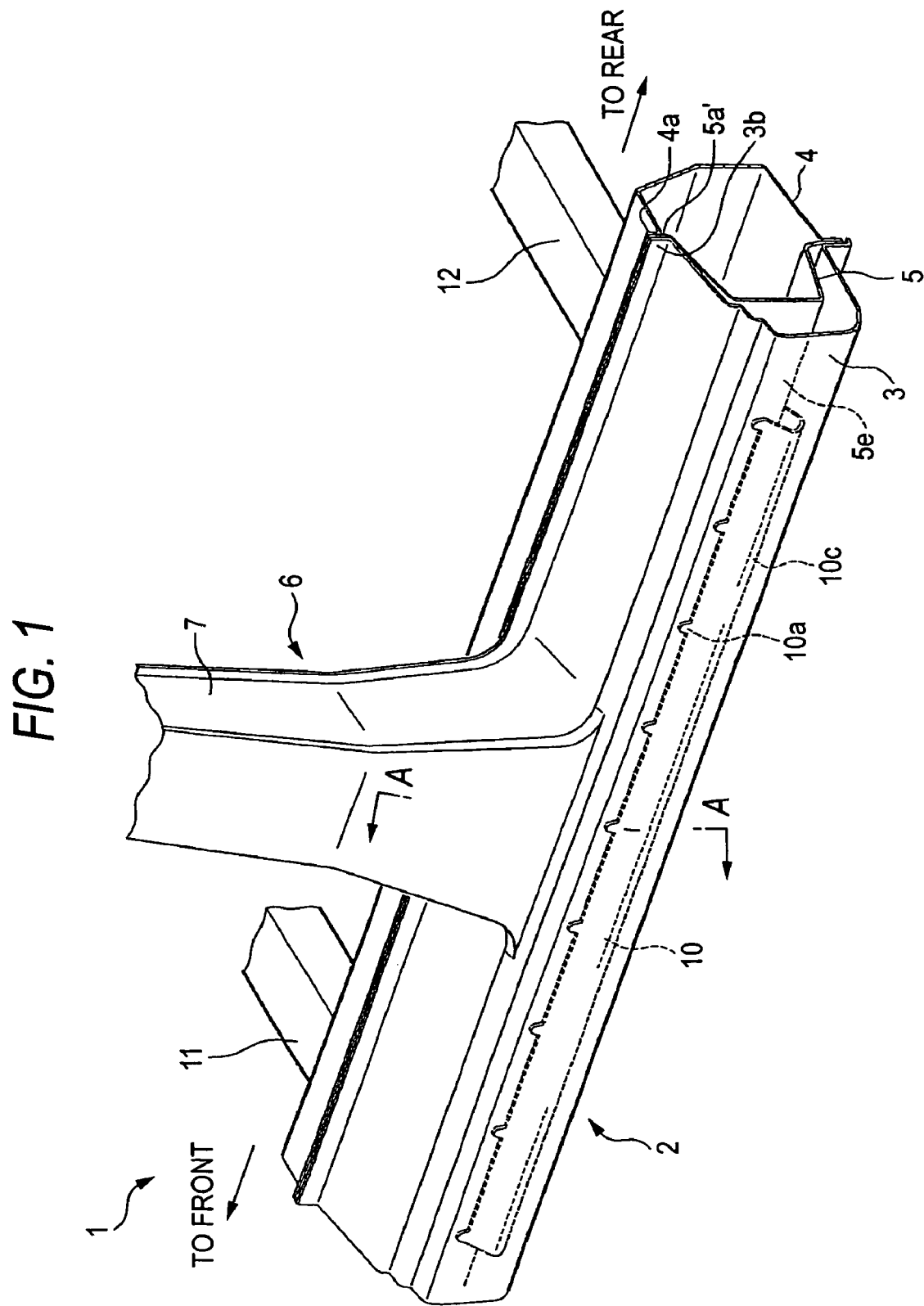
FIG. 1 is a schematic perspective view which shows the vicinity of a location where a side sill and a center pillar are connected together to which a lower body construction according to the invention is applied.
Figure 2:
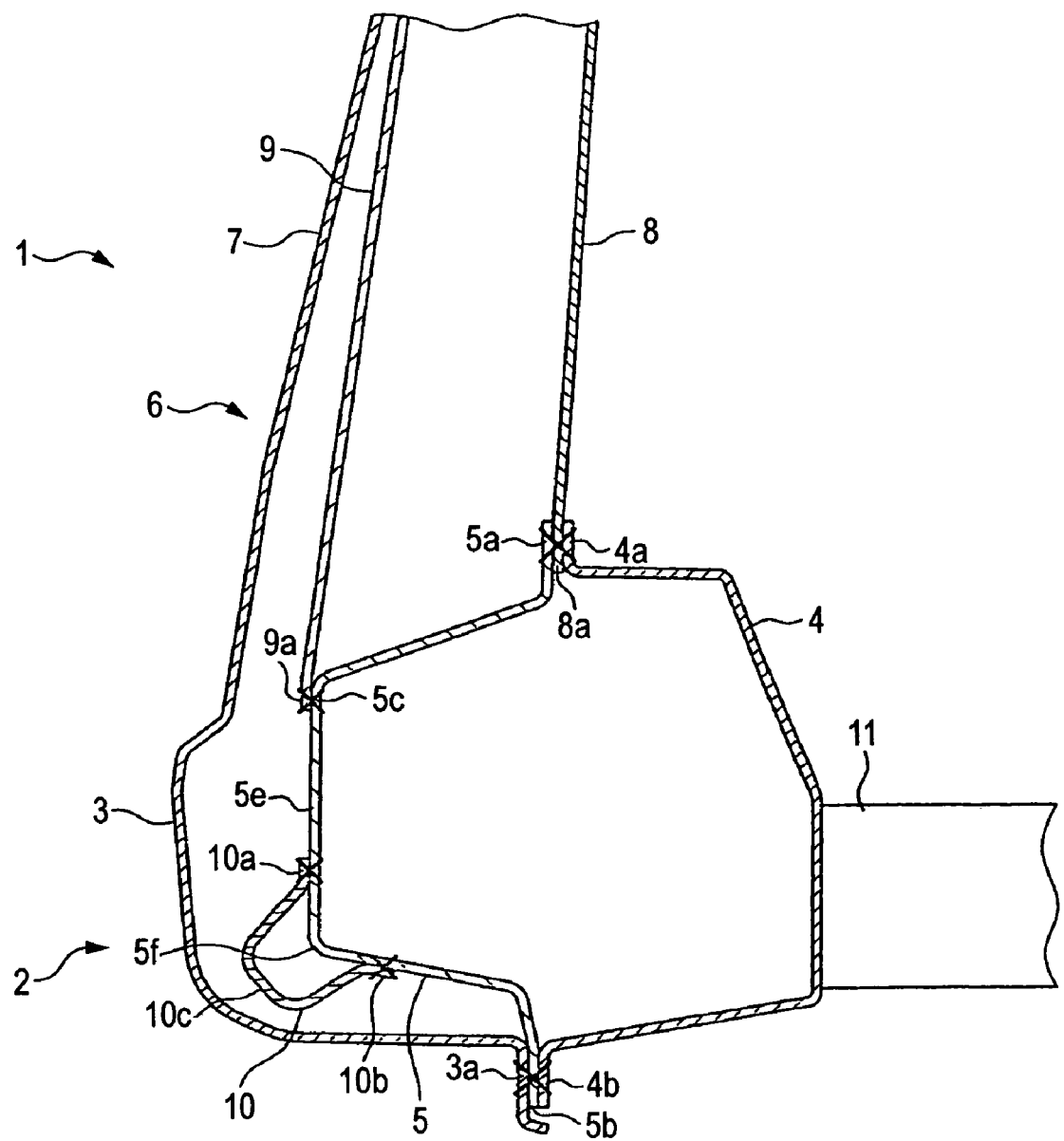
FIG. 2 is a sectional view taken along the line A-A in FIG. 1.

Hereinafter, the invention will be described based on an embodiment shown in the drawings. FIG. 1 is a schematic perspective view which shows the vicinity of a location where a side sill to which a lower body construction according to the invention is applied and a center pillar are connected together, and FIG. 2 is a sectional view taken along the line A-A in FIG. 1. In FIG. 1, the left of the drawing is the front of a body 1, and the right of the drawing is the rear of the body 1. Note that while FIGS. 1 and 2 show the vicinity of the location where a side sill 2 and a center pillar 6, which lie on a left-hand side of the body, are connected together, the vicinity of a location where a side sill and a center pillar of a right-hand side of the body are connected together is constructed in the same manner.

As shown in both the figures, the side sill 2, which constitutes a framework of a lower part of the body 1 and extends in a longitudinal direction of the body 1, includes an outer side sill panel 3 which extends in the longitudinal direction of the body 1 and lies on an outside (a left side in FIG. 2) of the body, an inner side sill panel 4 which extends in the longitudinal direction of the body 1 and lies on the side of a passenger compartment (a right side in FIG. 2), and a primary reinforcement panel 5 of a substantially C-shaped cross section as a primary reinforcement member which is provided between the outer and inner side sill panels 3, 4 and which extends in the longitudinal direction of the body 1 with an opening thereof oriented towards an inside of the passenger compartment. In addition, a lower portion of the center pillar 6 which is provided to extend in a vertical direction (upwards in FIG. 2) of the body 1 is connected to an upper portion of a substantially longitudinally central portion of the side sill 2. The center pillar 6 is, as shown in FIG. 2, made up of an outer center pillar panel 7 which extends in the vertical direction of the body 1 and lies on an outside of the passenger compartment, an inner center pillar panel 8 which extends in the vertical direction of the body 1 and lies on the inside of the passenger compartment, and a center pillar reinforcement panel 9 which is provided between the outer and inner center pillar panels 7, 8 and which extends in the vertical direction of the body 1 along the vicinity of the outer center pillar panel 7. Note that the outer side sill panel 3 and the outer center pillar panel 7 are formed through one-piece molding (refer to FIG. 1).

As shown in FIG. 2, in the vicinity of the location where the side sill 2 and the center pillar 6 are connected together, upper end edge portions 4a, 5a of the inner side sill panel 4 and the primary reinforcement member 5 are joined together through spot welding with a lower end edge portion 8a of the inner center pillar panel 8 held therebetween, and lower end edge portions 3a, 4b of the outer side sill panel 3 and the inner side sill panel 4 are joined together through spot welding with a lower end edge portion 5b of the primary reinforcement panel 5 held therebetween. In addition, a lower end edge portion 9a of the center pillar reinforcement panel 9 is joined to an upper corner portion 5c of the primary reinforcement panel 5 through spot welding. Note that an upper end edge portion 3b of the outer side sill panel 3 and the upper end edge portion 4a of the inner side sill panel 4 are joined together through spot welding with an upper end edge portion 5a' of the primary reinforcement panel 5 held therebetween along other portions of the side sill 2 than a portion thereof which lies in the vicinity of where the center pillar 6 is connected to the side sill 2 (refer to FIG. 1).

In addition, an upper end edge portion 10a and a lower end edge portion 10b of a secondary reinforcement panel 10 of a substantially C-shaped cross section, which function as a secondary reinforcement member, are joined through spot welding to the primary reinforcement panel 5 on both sides of a lower corner portion 5f of a projecting surface 5e of the primary reinforcement panel 5 which projects towards the outside of the passenger compartment along a longitudinal direction of the primary reinforcement panel 5 in such a manner as to straddle the lower corner portion 5f. The secondary reinforcement panel 10 is disposed in the vicinity of where the side sill 2 and the center pillar 6 are connected together in such a manner that a projecting surface 10c thereof provided at a middle portion between the upper end edge portion 10a and the lower end edge portion 10b is oriented obliquely downwards relative to a transverse direction (a horizontal direction in FIG. 2) of the vehicle (in this embodiment, angularly downwards at about 45 degrees relative to the transverse direction of the body 1).

A front floor cross member 11 and a middle floor cross member 12 extend along the transverse direction between the inner side sill panels 4 of the left and right side sills 2 (the inner side sill panel of the side sill lying on the right-hand side of the body is not shown) and are joined through spot welding to the inner side sill panels 4 in such a manner as to be positioned, respectively, forward and rearward of the center pillar 6 which lies in between the cross members. In this embodiment, portions of the secondary reinforcement panel 10 which lie in the vicinities of longitudinal end portions thereof are positioned in front of ends of the front floor cross member 11 and the middle floor cross member 12, respectively, via the inner side sill panel 4, the primary reinforcement panel 5 and the outer side sill panel 3.

Figure 3:
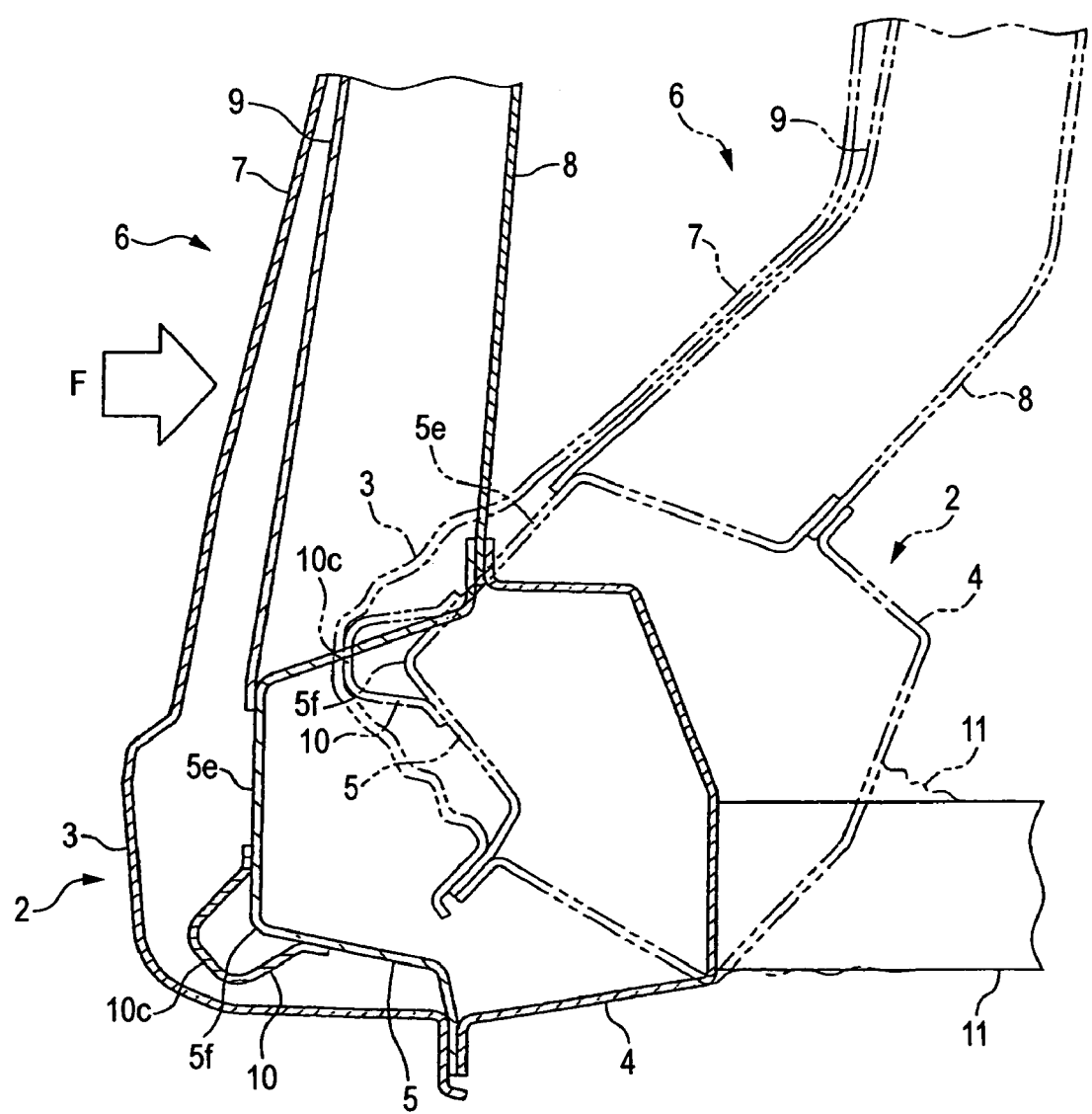
FIG. 3 is a sectional view which shows a state in which an impact load is inputted by a side impact or collision to the vicinity of the location where the side sill and the center pillar are connected together to which the lower body construction according to the invention is applied.

According to the lower body construction according to the embodiment of the invention, with an excessive impact load generated at the time of side impact or collision, as shown in FIG. 3, at an initial stage of the side impact, even when the primary reinforcement member 5 exhibits a high rigidity against an impact load F inputted from a side of the body 1, there occur a deformation of the outer side sill panel 3 of the side sill 2 towards the inside of the passenger compartment (to the right in FIG. 3) and a falling deformation (a bending deformation) of the center pillar 6 joined to the upper portion of the substantially longitudinally central portion of the side sill 2 towards the inside of the passenger compartment, which triggers a twisting deformation of the side sill 2 (a state indicated by chain double-dashed lines in FIG. 3) as the side sill 2 is pulled along with the falling deformation of the center pillar 6.

As this occurs, as indicated by the chain double-dashed lines in FIG. 3, the projecting surface 5e of the primary reinforcement panel 5 inside the side sill 2 is made to be oriented obliquely upwards by virtue of the twisting deformation of the side sill 2, whereby the projecting surface 10c of the secondary reinforcement panel 10 joined to the primary reinforcement panel 5 in such a manner as to straddle the lower corner portion 5f thereof is made to be oriented substantially horizontally relative to the side of the body 1 (towards the left in FIG. 3).

Due to this, since the secondary reinforcement panel 10 which is now oriented towards the side of the body 1 allows the side sill 2 to maintain the high rigidity against the impact load F inputted from the relevant side of the body 1 at a middle stage of the side impact, the deformation of the side sill 2 towards the inside of the passenger compartment is suppressed, and the falling deformation of the center pillar 6 connected to the upper portion of the side sill 2 towards the inside of the passenger compartment is suppressed. Furthermore, the impact load F is effectively absorbed by the front floor cross member 11 and the middle floor cross member 12 which are joined to the inner side sill panel 4 at the positions corresponding to the vicinities of the ends of the secondary reinforcement member 10. Note that the front floor cross member 11 and the middle floor cross member 12 also absorb the impact load F at the initial stage of the side impact.

Thus, according to the lower body construction according to the embodiment of the invention, with the excessive impact load generated at the time of side impact or collision, even in the event that there occurs the falling deformation of the center pillar 6 joined to the side sill 2 towards the inside of the passenger compartment, which then triggers the twisting deformation of the side sill 2 as the side sill 2 is pulled along with the falling deformation of the center pillar 6 at the initial stage of the side impact, the side sill 2 is allowed to maintain the high rigidity against the impact load F at the middle stage of the side impact due to the projecting surface 10c of the secondary reinforcement panel 10 being made to be oriented to the side of the body by virtue of the twisting deformation of the side sill 2, and therefore, it becomes possible to suppress not only the deformation of the side sill 2 towards the inside of the passenger compartment but also the falling deformation of the center pillar 6 joined to the upper portion of the side sill 2 towards the inside of the passenger compartment.

Furthermore, at the middle stage of the side impact, the impact load F inputted to the secondary reinforcement panel 10 can effectively be absorbed by the front floor cross member 11 and the middle floor cross member 12 which are joined to the inner side sill panel 4 at the positions corresponding to the vicinities of the ends of the secondary reinforcement member 10, and therefore, it becomes possible to suppress more effectively not only the deformation of the side sill 2 towards the inside of the passenger compartment but also the falling deformation of the center pillar 6 towards the inside of the passenger compartment.

In addition, while in the embodiment, the lower body construction according to the invention has been described as being applied to the vicinity of the location where the side sill and the center pillar are connected together, the invention is not limited thereto but may be applied, for example, to the vicinity of a location where the side sill and a front pillar are connected together.

Additionally, while in the embodiment, the secondary reinforcement panel 10 joined to the primary reinforcement panel 5 in such a manner as to straddle the lower corner portion 5f thereof has been described as being disposed in the vicinity of the location where the side sill 2 and the center pillar 6 are connected together, the secondary reinforcement panel 10 may be configured to extend over the whole area of the primary reinforcement panel 5 in the longitudinal direction thereof (in the longitudinal direction of the body) including the vicinity of the joining portion of the side sill 2 to the center pillar 6.

It will be apparent to those skilled in the art that various modifications and variations can be made to the described preferred embodiment of the present invention without departing from the spirit or scope of the invention. Thus, it is intended that the present invention cover all modifications and variations of this invention consistent with the scope of the appended claims and their equivalents.

I claim:

1. A lower body construction comprising:
   a tubular side sill extending in a longitudinal direction of a body of a vehicle;
   a pillar extending in a vertical direction of the body and connected to an upper portion of the side sill at a lower end portion thereof;
   a primary reinforcement member interposed within the side sill in such a manner as to extend in the longitudinal direction of the body and having a projecting surface defining a lower corner portion that projects towards the outside of a passenger compartment on a side of the body so that an opening thereof is oriented towards an inside of the passenger compartment; and
   a secondary reinforcement member having an upper end edge portion, a lower end edge portion, and a middle portion disposed between said upper end edge portion and said lower end edge portion, said secondary reinforcement member having a c-shaped cross-section and being joined to an outer surface of the primary reinforcement member along the upper end edge portion and the lower end edge portion so as to straddle the lower corner portion of the projecting surface of the primary reinforcement member while extending in the longitudinal direction of the body, said secondary reinforcement member middle portion having a projecting surface which projects obliquely downwards between the upper end edge portion and the lower end edge portion,
   wherein the secondary reinforcement member is disposed at at least a portion on the primary reinforcement member which lies below a location where the side sill and the pillar are connected together.

2. The lower body construction according to claim 1, further comprising cross members that extend in a transverse direction of the vehicle, said cross members being joined to positions on a passenger compartment side of the side sill which correspond to vicinities of both longitudinal end portions of the secondary reinforcement member.

3. The lower body construction of claim 1, wherein the upper and lower end edge portions of the secondary reinforcement member are affixed to the primary reinforcement member at generally equal distances from the lower corner thereof.

4. The lower body construction of claim 2, wherein the upper and lower end edge portions of the secondary reinforcement member are affixed to the primary reinforcement member at generally equal distances from the lower corner thereof.

* * * * *